(12) United States Patent
Nakamura et al.

(10) Patent No.: US 11,485,423 B2
(45) Date of Patent: Nov. 1, 2022

(54) VEHICLE-BODY STRUCTURE OF VEHICLE

(71) Applicant: MAZDA MOTOR CORPORATION, Hiroshima (JP)

(72) Inventors: Kaito Nakamura, Aki-gun (JP); Miho Kurata, Aki-gun (JP); Sakayu Terada, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 122 days.

(21) Appl. No.: 17/159,501

(22) Filed: Jan. 27, 2021

(65) Prior Publication Data

US 2021/0261203 A1 Aug. 26, 2021

(30) Foreign Application Priority Data

Feb. 26, 2020 (JP) .............................. JP2020-030177

(51) Int. Cl.
  B60J 7/00 (2006.01)
  B62D 25/20 (2006.01)
  B62D 24/02 (2006.01)

(52) U.S. Cl.
  CPC ............. B62D 25/20 (2013.01); B62D 24/02 (2013.01)

(58) Field of Classification Search
  CPC ....... Y02E 60/10; Y02E 60/50; H04L 5/0044; H04W 72/042; B60R 21/045; E04D 2003/3615; E04D 3/362; E04B 2002/7483; E04C 2003/0413; E04C 2003/043

See application file for complete search history.

(56) References Cited

U.S. PATENT DOCUMENTS

| | | | | |
|---|---|---|---|---|
| 4,898,419 A | * | 2/1990 | Kenmochi | ............. B62D 21/10 428/116 |
| 7,104,595 B2 | * | 9/2006 | Kamura | ................ B62D 21/10 296/184.1 |
| 8,585,134 B2 | * | 11/2013 | Yasui | ................... B62D 21/152 296/204 |
| 2016/0311382 A1 | * | 10/2016 | Murasawa | ............. B60N 3/042 |
| 2018/0346038 A1 | * | 12/2018 | Nakagawa | ............. B62D 25/20 |
| 2019/0168690 A1 | * | 6/2019 | Shigihara | .............. B60R 13/083 |
| 2021/0261203 A1 | * | 8/2021 | Nakamura | ............. B62D 24/02 |

FOREIGN PATENT DOCUMENTS

JP 2004-237871 A 8/2004

* cited by examiner

*Primary Examiner* — Kiran B Patel
(74) *Attorney, Agent, or Firm* — Studebaker & Brackett PC

(57) ABSTRACT

Floor panel vibration is reduced by suppressing a mode in which an entire region surrounded by a plurality of frame members in a floor panel vibrates. Vehicle-body framework members having closed cross-section structures, and a panel member to which vibration is transmitted from an engine or/and a suspension via the vehicle-body framework members are provided. The panel member includes a flange portion having a planar shape on its outer peripheral edge and to which the vehicle-body framework members are joined along the panel outer peripheral edge; a curved surface portion that is curved such that a place closer to a panel central side bulges out more to a lower side in a continuous manner from a panel-central-side edge portion of the flange portion; and a flat surface portion that extends to the panel central side from the panel-central-side edge portion of the curved surface portion in a continuous manner.

9 Claims, 11 Drawing Sheets

(a)

(b)

VEHICLE-BODY STRUCTURE OF VEHICLE

TECHNICAL FIELD

The present disclosure relates to a vehicle-body structure of a vehicle including, for example, a vehicle-body framework member including a closed cross-section portion, and a panel member such as a floor panel to which vibration is transmitted from an engine or/and a suspension via the vehicle-body framework member of an automobile.

BACKGROUND ART

In general, vibration of an engine itself and road noise transmitted from a suspension are transmitted to a floor panel via frame members serving as a plurality of vehicle-body framework members connected to the engine and the suspension. As a result, in a vehicle-body structure of a vehicle, there is a fear that air in a vehicle cabin may greatly vibrate due to the vibration of the floor panel and the NVH (Noise, Vibration, Harshness) performance in the vehicle cabin may be adversely affected.

Regarding the problem as above, various countermeasures as that exemplified in Japanese Patent Laid-Open No. 2004-237871 are taken. A vehicle-body floor panel structure in Japanese Patent Laid-Open No. 2004-237871 includes a plurality of frame members connected to an engine or a suspension, and a floor panel on which the frame members are disposed along the outer periphery thereof. Japanese Patent Laid-Open No. 2004-237871 discloses a structure having a curved surface portion (spherical bead) formed in a dome shape on the central side in a region surrounded by the plurality of frame members, and a flat surface portion, which is flat and has a lower rigidity than the curved surface portion, on the entire periphery of the curved surface portion. In the structure, a damping material is provided on only the flat surface portion.

However, when vibration is transmitted to the floor panel from the plurality of frame members, a phenomenon in which the flat surface portion vibrates and the curved surface portion positioned on the panel center with respect to the flat surface portion integrally vibrates by being induced by the flat surface portion, in other words, a phenomenon in which the entire region surrounded by the plurality of frame members in the floor panel vibrates may occur depending on the frequency of the vibration. When a phenomenon as above occurs, there is a fear that the area in which air is vibrated may increase, which leads to the deterioration of the NVH performance.

SUMMARY

The present disclosure has been made in view of the problem as above, to provide a vehicle-body structure of a vehicle capable of reducing the vibration of a panel member such as a floor panel by suppressing a mode in which an entire region surrounded by a plurality of frame members vibrates in the panel member.

The present disclosure relates to a vehicle-body structure of a vehicle, the vehicle-body structure including a vehicle-body framework member including a closed cross-section portion; and a panel member to which vibration is transmitted from an engine or/and a suspension via the vehicle-body framework member. In the vehicle-body structure, the panel member includes a flange portion, which is formed in a planar shape on a panel outer peripheral edge and to which the vehicle-body framework member is joined along the panel outer peripheral edge; a curved surface portion that is curved such that a place closer to a panel central side bulges out more to an upper side or a lower side in a continuous manner from a panel-central-side edge portion of the flange portion; and a flat surface portion that extends to the panel central side from the panel-central-side edge portion of the curved surface portion in a continuous manner.

With the abovementioned configuration, the curved surface portion has a high rigidity due to having a curved surface and is restricted because the flange portion included on the outer edge is joined to the vehicle-body framework member. Therefore, only the flat surface portion resonates, and hence the mode in which the entire panel member such as a floor panel vibrates can be suppressed.

In an aspect of the present disclosure, a vibration damping member is included on at least the flat surface portion out of the curved surface portion and the flat surface portion. With the abovementioned configuration, the vibration can be further suppressed by dissipating the vibration energy generated in the flat surface portion by the vibration damping member.

In another aspect of the present disclosure, the flat surface portion including the vibration damping member is provided at an area ratio that is within a range from 30 percent to 45 percent with respect to an entirety of the panel member. With the abovementioned configuration, the influence of vibrating the air by the resonance can be suppressed (in other words, the NVH performance can be improved) more as the flat surface portion is set to be smaller. However, when the flat surface portion is set to be too small, the area ratio of the curved surface portion in the entire panel member such as the floor panel increases, and a mode in which the entire panel member such as the floor panel resonates occurs. Therefore, by setting the flat surface portion at the abovementioned appropriate area ratio, the vibration of the entire panel member such as the floor panel can be further suppressed.

In a further aspect of the present disclosure, the panel member is a floor panel, and the flat surface portion is formed such that an outer peripheral edge portion of the flat surface portion has a substantially same aspect ratio as an aspect ratio of the floor panel having a rectangular shape in vehicle plan view and has an oval or elliptical shape of which longitudinal direction and short direction substantially coincide with a longitudinal direction and a short direction of the floor panel.

With the abovementioned configuration, the periphery of corner portions (sections equivalent to corners of the flat surface portion in plan view) out of the flat surface portion vibrates less easily as compared to a place on the central side. Therefore, there is a fear that the accumulation amount of the strain energy may be reduced in the vibration damping member included on the periphery of the corner portions out of the vibration damping member included in the flat surface portion as compared to the vibration damping member included on the central side. By forming the flat surface portion in a round shape that does not have a corner portion, the entire flat surface portion can be vibrated, and hence strain energy can be efficiently accumulated and converted to thermal energy by the vibration damping member included in the flat surface portion. Therefore, the mass efficiency of the vibration damping member included in the flat surface portion can be increased.

According to the present disclosure, the vibration of the panel member can be reduced by suppressing the mode in which the entire region surrounded by the plurality of frame members in the panel member such as the floor panel vibrates.

DETAILED DESCRIPTION

An embodiment of a vehicle-body structure of a vehicle of the present disclosure is described in detail below with reference to the drawings by taking a floor portion forming a floor of a vehicle cabin portion of an automobile as an example.

Figure 1:
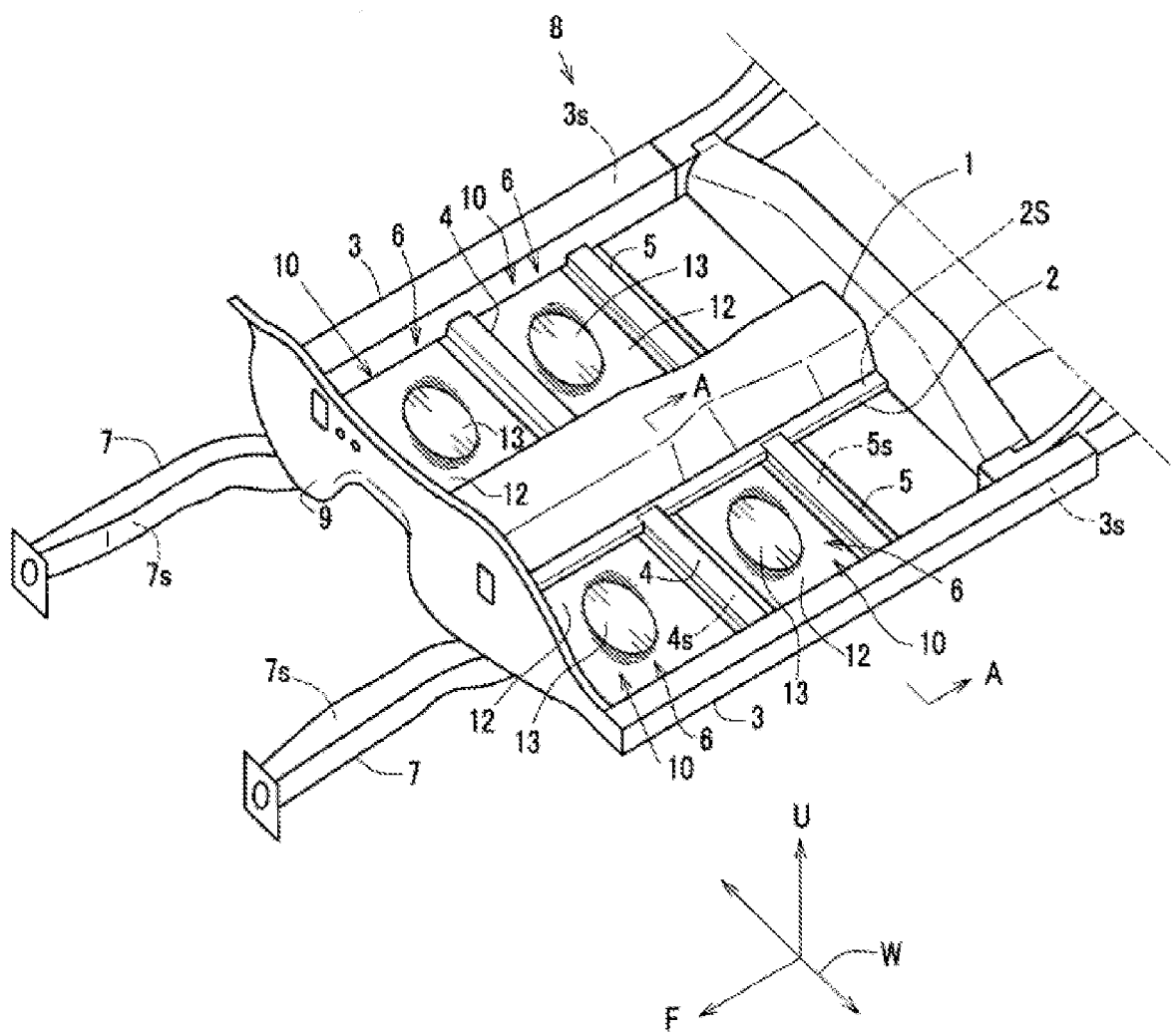
FIG. 1 is a perspective view illustrating a floor portion of an automobile including floor panels of an embodiment of the present disclosure and the main part at the periphery on the front side thereof.
Figure 2:
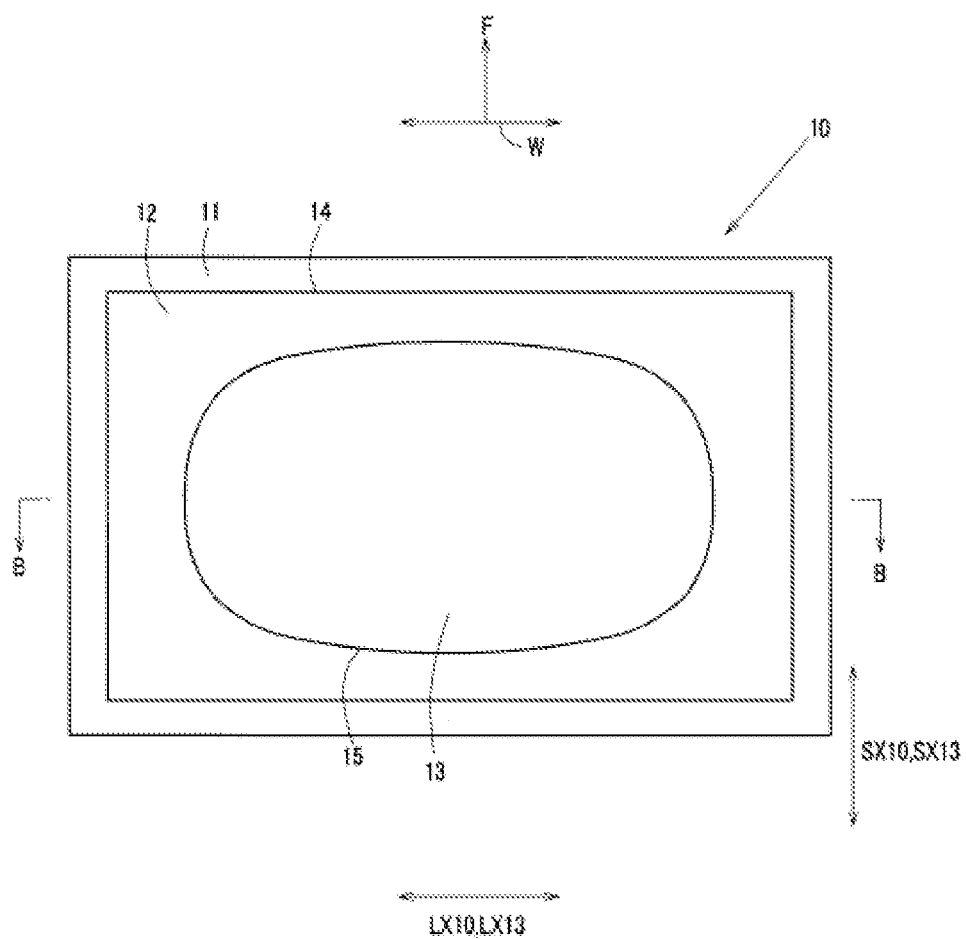
FIG. 2 is a plan view of the floor panel of this embodiment.
Figure 3A:
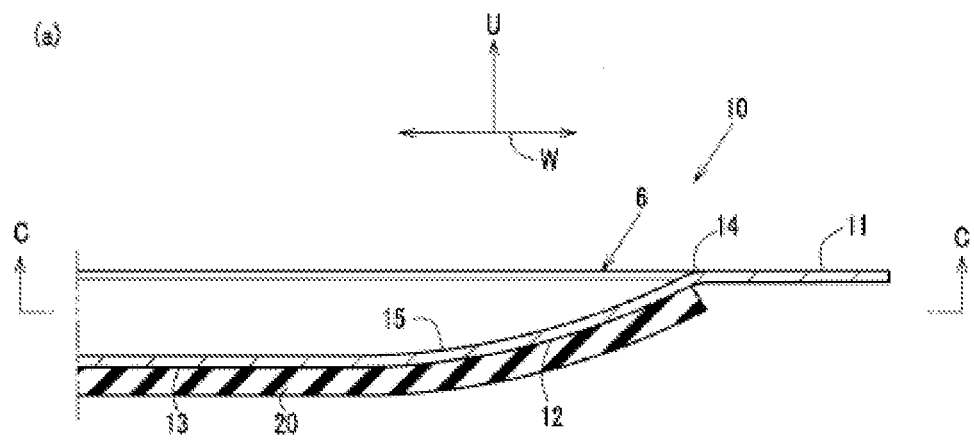
FIG. 3A is a cross-section of the main part of FIG. 2 taken along line B-B and FIG. 3B is a cross-sectional view of the main part of the floor panel of FIG. 3A taken along line C-C.
Figure 3B:
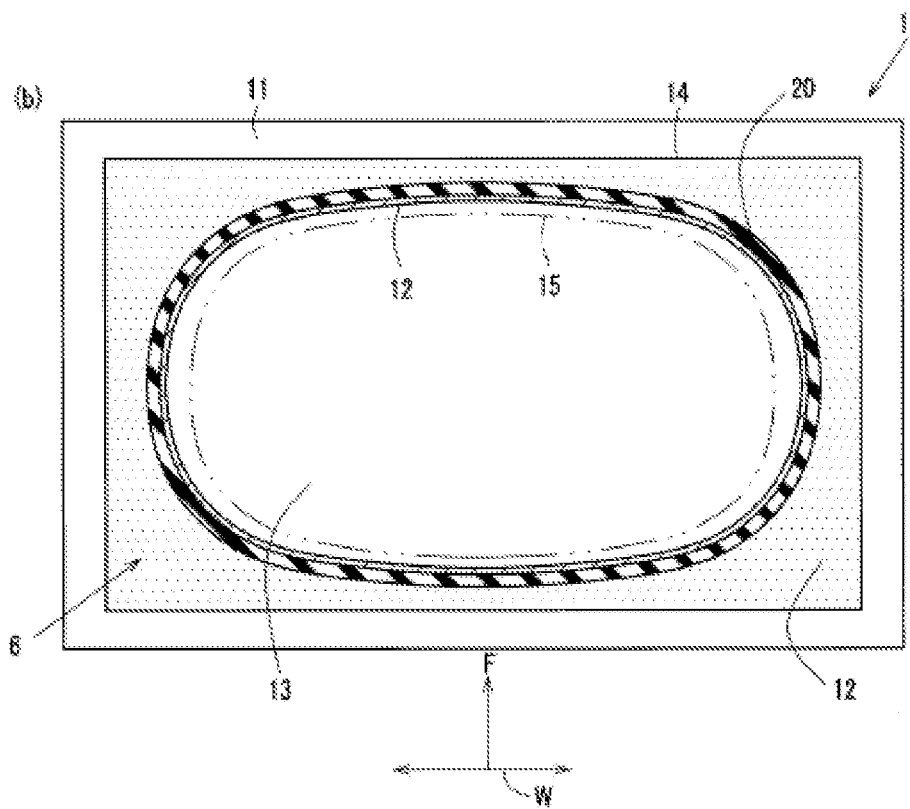
Figure 4:
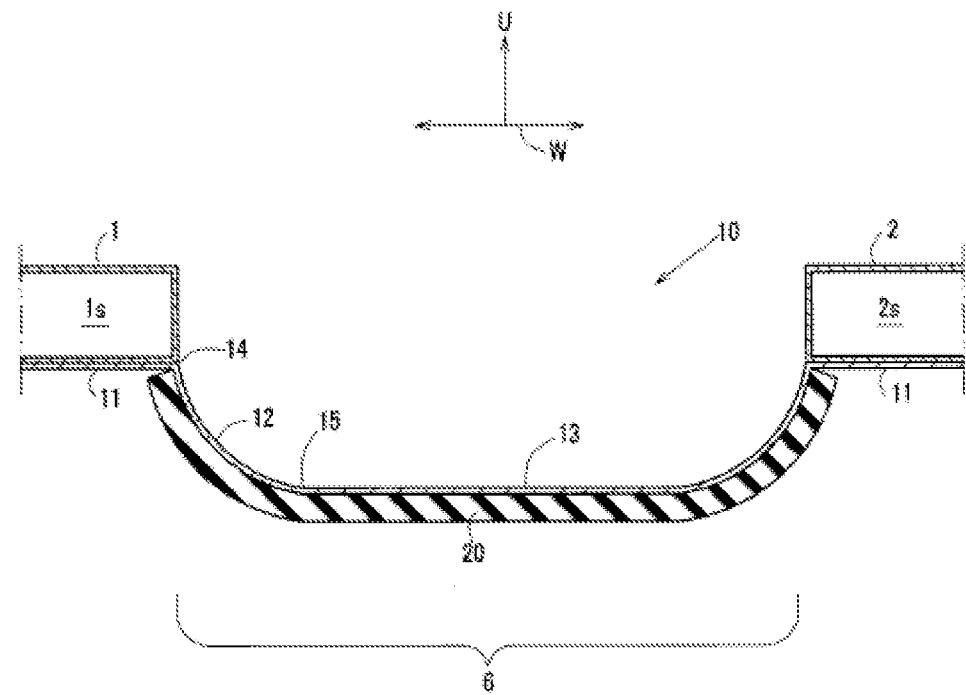
FIG. 4 is a cross-sectional view illustrating the floor panel of this embodiment and the periphery thereof more schematically by a cross-sectional view of the main part of FIG. 1 taken along line A-A.

FIG. 1 is a plan view of the floor portion of the automobile including floor panels 10 of this embodiment, FIG. 2 is a plan view illustrating the outline of the floor panel 10 of this embodiment, FIG. 3A is a cross-sectional view of the main part of FIG. 2 taken along line B-B, FIG. 3B is a cross-sectional view of the main part of FIG. 3A taken along line C-C, and FIG. 4 is a cross-sectional view schematically illustrating the main part of FIG. 1 taken along line A-A. In the drawings, arrow F indicates the vehicle front side, arrow U indicates the vehicle upper side, and arrow W indicates the vehicle width direction.

As illustrated in FIG. 1, on a lower portion of the vehicle, a plurality of vehicle-body framework members such as a pair of left and right tunnel side frames 2 (only the vehicle left side is shown) that are disposed on both sides of a tunnel portion 1 extending in the vehicle-body front-rear direction on the central side of the vehicle width direction and extend along the tunnel portion 1, a pair of left and right side sills 3 that extend in the vehicle-body front-rear direction on both sides of the lower portion of the vehicle on the vehicle-width-direction outer sides thereof, and cross members 4 and 5 on the front and rear sides that extend in the vehicle width direction so as to connect the tunnel side frames 2 and the side sills 3 corresponding to the left side and the right side to each other and are disposed to be spaced apart from each other in the vehicle front-rear direction.

The floor panels 10 of this embodiment are included in regions 6 (vehicle-body framework member enclosing regions 6), each of which are surrounded by the vehicle-body tunnel side frame 2, the side sill 3, and the cross members 4 and 5 on the front and rear sides, on each of the left side and the right side of the lower portion.

As the floor panel 10 of this embodiment, a configuration in which a plurality of the floor panels 10 are included for the vehicle-body framework member enclosing regions 6 is employed, but the floor panel 10 may be integrally formed across the plurality of vehicle-body framework members enclosing regions 6 included in the vehicle-body lower portion.

As illustrated in FIG. 1, the automobile of this embodiment also includes front side frames 7, for example, as other vehicle-body framework members besides the abovementioned vehicle-body framework members. The front side frames 7 extend in the vehicle front-rear direction so as to be able to support an engine (not shown) and a front suspension (not shown) in a mounted manner on both sides of a place on the front side with respect to a dash panel 9 that forms a vehicle front wall of the vehicle cabin portion 8.

The vibration of the engine and the front suspension is transmitted to the floor panels 10 via the plurality of vehicle-body framework members, specifically, from the front side frames 7 via the tunnel side members, the side sills 3, and the cross members 4 and 5 on the front and rear sides described above.

The abovementioned vehicle-body framework members 2, 3, 4, 5, and 7 are not limited to be formed in cylindrical shapes that extend in the longitudinal direction so as to have closed cross-section portions 2s, 3s, 4s, 5s, and 7s (closed cross-sectional spaces) in themselves, and may each have a cross-sectional shape orthogonal to the extending direction that forms a closed cross-section shape by collaborating with a surface to be joined of a side wall of the tunnel portion 1, the floor panel 10, or the like by being joined to the surface to be joined.

As illustrated in FIG. 2 to FIG. 4, the floor panel 10 is obtained by integrally press molding a steel plate and is formed in a rectangular shape so as to correspond to the vehicle-body framework member enclosing region 6 having a rectangular shape. The floor panel 10 includes a flange portion 11 formed in a planar shape along an outer edge to be joinable to the vehicle-body framework members, a curved surface portion 12 curved in a dome shape to the upper side, and a flat surface portion 13 having a central side that is equivalent to a top portion of the curved surface portion 12 in plan view and is formed in a planar shape (flat and horizontal).

The curved surface portion 12 extends from a panel-central-side edge portion 14 of the flange portion 11 to the panel central side in a continuous manner over the entire perimeter of the flange portion 11, and extends while being curved such that a place closer to the panel central side bulges out more in a dome shape (in other words, a spherical shape, a bowl shape, or a three-dimensional curved shape) to one side (the lower side in this example) in the thickness direction (vehicle up-down direction).

In other words, as illustrated in FIG. 3B, the curved surface portion 12 of this embodiment is formed in a curved shape not only in cross-sectional shapes along the vehicle front-rear direction and the vehicle width direction, but also in a cross-sectional shape (in other words, a cross-sectional shape cut at a surface parallel to the flat surface portion 13) orthogonal to the vehicle up-down direction.

The curved surface portion 12 is formed in a curved shape in which the slope of a tangent of each section becomes gentler (becomes more horizontal) as the slope approaches the panel central side (in other words, approaches the lower side). As illustrated in FIG. 3B, the curved surface portion 12 of this embodiment has a cross-section orthogonal to the vehicle up-down direction that is formed in a curved shape that decreases in size as the curved shape approaches the panel central side while maintaining a shape that is substantially similar to the shape of an outer peripheral edge portion 15 (a border portion (15) with respect to the curved surface portion 12) of the flat surface portion 13 and a shape that is concentric with the outer peripheral edge portion 15 of the flat surface portion 13.

The flat surface portion 13 extends in a planar shape (flat horizontal shape) from the panel-central-side edge portion (15) of the curved surface portion 12 to the panel central side in a continuous manner, and the outer peripheral edge portion 15 of the flat surface portion 13 is spaced apart to the panel central side from the panel-central-side edge portion 14 of the flange portion 11 over the entire perimeter and is disposed in a lower-side position (lower position) than the flange portion 11. In this embodiment, the flat surface portion 13 is disposed to be parallel to the flange portion 11.

As illustrated in FIG. 2, the outer peripheral edge portion 15 of the flat surface portion 13 is formed in an elliptical shape. The major axis of the elliptical flat surface portion 13 and the longitudinal direction of the rectangular floor panel 10 coincide with each other, and the minor axis of the flat surface portion 13 and the short direction of the floor panel 10 coincide with each other. In FIG. 2, arrow LX13 indicates the major axis of the flat surface portion 13, arrow SX13 indicates the minor axis of the flat surface portion 13, arrow LX10 indicates the longitudinal direction of the floor panel 10, and arrow SX10 indicates the short direction of the floor panel 10.

The flat surface portion 13 is formed so as to have the substantially same aspect ratio as the outer edge of the rectangular floor panel 10. In other words, in this embodiment, the ratio between the major axis and the minor axis of the flat surface portion 13 and the ratio between the longitudinal direction and the short direction of the floor panel 10 substantially coincide with each other.

The flat surface portion 13 is provided at an area ratio that is within a range from 30 percent to 45 percent with respect to the entire floor panel 10 (in other words, an area obtained by adding up the flange portion 11, the curved surface portion 12, and the flat surface portion 13). In this embodiment, the flat surface portion 13 is provided at an area ratio of 40 percent to the entire floor panel 10.

As illustrated in FIG. 3A, FIG. 3B, and FIG. 4, in the floor panel 10, a vibration damping member 20 (vibration controlling member) is applied to at least the flat surface portion 13 out of the curved surface portion 12 and the flat surface portion 13. In this embodiment, the vibration damping member 20 is applied to the entire region of a lower surface of the flat surface portion 13 and the curved surface portion 12 at a substantially uniform thickness.

The flange portion 11 is positioned on the outer side with respect to the vehicle-body framework member enclosing region 6 in plan view, and the curved surface portion 12 and the flat surface portion 13 are positioned in (on the inside of) the vehicle-body framework member enclosing region 6 in plan view.

In this embodiment, as the vibration damping member 20, foamed polyurethane resin serving as a viscoelastic member is employed. However, the vibration damping member 20 is not limited thereto, and a rubber material or other elastomer resin such as polyester resin and vinyl ester resin may be used.

When the vibration damping member 20 is included on at least the flat surface portion 13 of the floor panel 10, the vibration damping member 20 is not limited to being applied as described above and may be included by adhesion (pasting), welding, and the like.

The plurality of vehicle-body framework members 2, 3, 4, and 5 are disposed over the entire perimeter of the flange portion 11 forming the outer edge of the floor panel 10 and are joined to the flange portion 11 equivalent to edge sides of the outer edge of the floor panel 10 from the upper side by spot welding or arc welding, for example.

In this embodiment, as illustrated in FIG. 1, the front-side cross member 4 is joined the flange portion 11 equivalent to a front edge of the floor panel 10, the tunnel side frame 2 is joined to the flange portion 11 equivalent to an inner edge in the vehicle width direction, the side sill 3 is joined to the flange portion 11 equivalent to the vehicle-width-direction outer edge, and the rear-side cross member 5 is joined to the flange portion 11 equivalent to a rear edge. The vehicle-body framework members 2, 3, 4, and 5 are joined such that edge portions of the vehicle-body framework members 2, 3, 4, and 5 on the panel central side thereof coincide with the panel-central-side edge portion 14 of the flange portion 11 in plan view in a state in which the vehicle-body framework members 2, 3, 4, and 5 are disposed on the flange portion 11 of the floor panel 10 (see FIG. 4).

As described above, the vehicle-body framework members are joined to the flange portion 11 of the floor panel 10, and hence the vibration energy transmitted to the flange portion 11 from the vehicle-body framework members is transmitted and dispersed to the side of the flat surface portion 13 that extends from the panel-central-side edge portion 14 of the flange portion 11 to the panel central side in a continuous manner.

Next, advantageous features of the panel shape itself of a floor panel 10' of the abovementioned embodiment are described with reference to FIG. 5 and FIG. 11 by comparison with the panel structure of the floor panel 10 of the related art.

Figure 5:
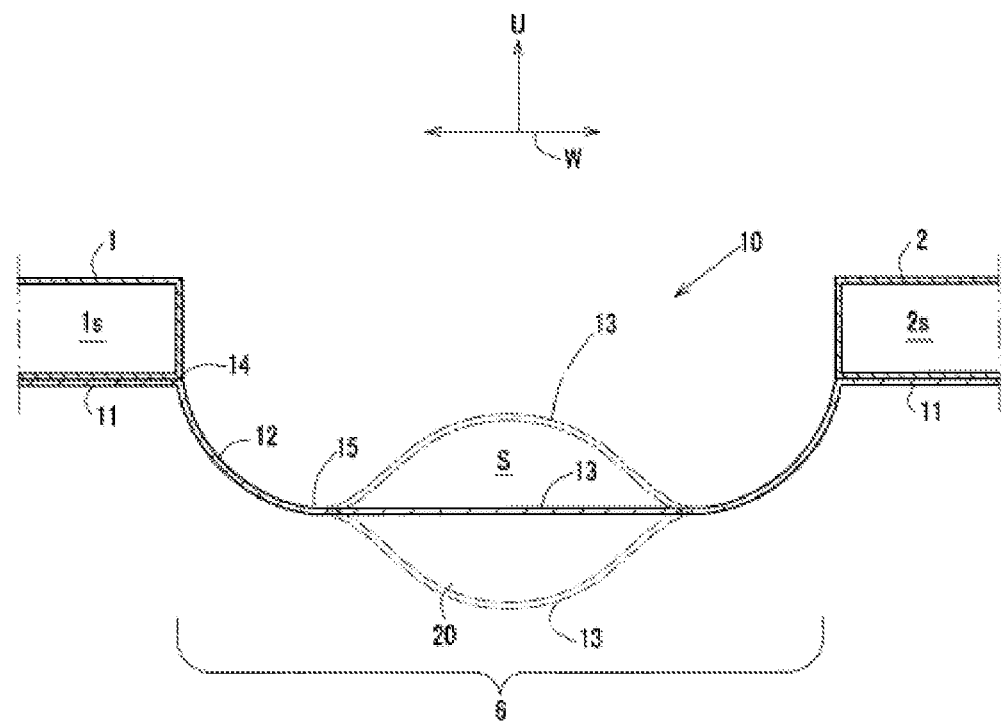
FIG. 5 is an effect explanatory view focusing on the panel shape of the floor panel of this embodiment.
Figure 11:
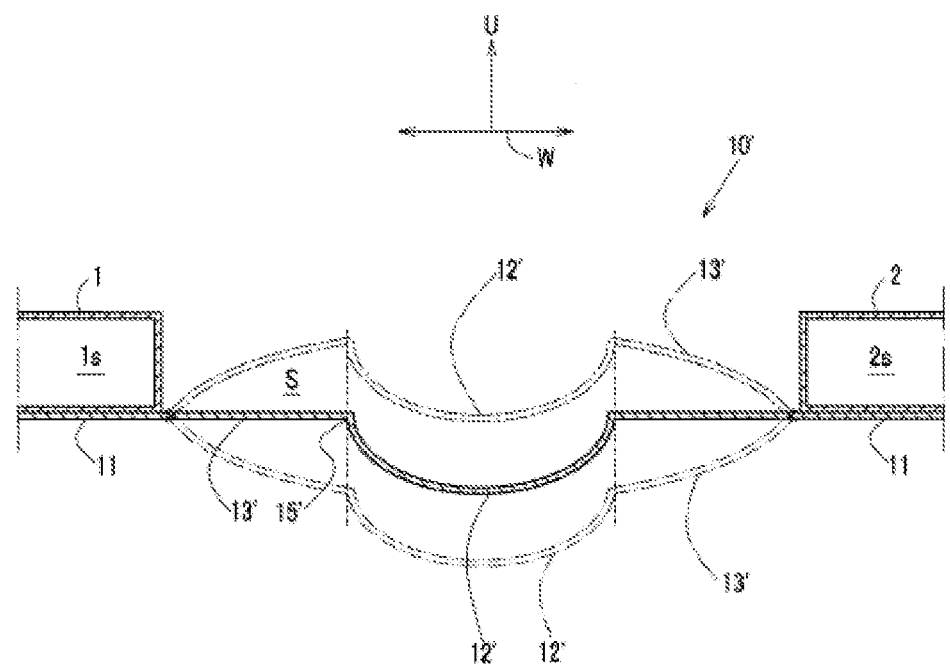
FIG. 11 is an effect explanatory view of a related-art floor panel.

FIG. 5 and FIG. 11 are both cross-sectional views schematically illustrating how the floor panels 10 and 10' periodically bending-deform to the upper side or the lower side when resonant vibration is input to the floor panels 10 and 10' from the vehicle-body framework members. FIG. 5 illustrates the deformation behavior of the floor panel 10 of Disclosure Example 1, and FIG. 11 illustrates the deformation behavior of the floor panel 10' of Related-art Example 1.

As illustrated in FIG. 5, the floor panel 10 of Disclosure Example 1 shows an example of the floor panel 10 of the present disclosure that has a panel shape similar to that of this embodiment described above but does not include the vibration damping member 20 on the flat surface portion 13. Meanwhile, as illustrated in FIG. 11, the floor panel 10' of Related-art Example 1 includes a curved surface portion 12' formed such that a place closer to the central side bulges out more to one side (the lower side in this example) in the thickness direction (vehicle up-down direction) in a dome shape on a panel center portion and includes a flat surface portion 13' on the entire periphery of the curved surface portion 12'.

In other words, in the floor panel 10 of Related-art Example 1, the flat surface portion 13 is formed so as to connect an inner edge of the flange portion 11 and an outer edge of the curved surface portion 12 to each other in a planar shape, and the curved surface portion 12' is formed such that the entirety thereof has a dome shape from the edge (a border portion 15' with respect to the flat surface portion 13') toward the panel center. First, when vibration is input to the floor panel 10' of Related-art Example 1 from the vehicle-body framework members 2, 3, 4, and 5, the flat surface portion 13' having a lower rigidity than the curved surface portion 12' vibrates (in other words, periodically bending-deforms in the up-down direction). In particular, at the time of resonance, when the flat surface portion 13' vibrates, the curved surface portion 12' having a high rigidity vibrates together with the flat surface portion 13' by being induced by the vibration as indicated by the shape after the bending deformation indicated by the one dot chain lines and the two dot chain lines in FIG. 11. In other words, the curved surface portion 12' has a high rigidity, and hence deforms to the upper side and the lower side by being induced by the bending deformation of the flat surface portion 13' included on the periphery thereof even the curved surface portion 12' itself is not bending-deformed. In the case as above, the air in the vehicle cabin easily vibrates, and hence the acoustic radiation power increases.

The air in the vehicle cabin portion 8 vibrates more easily as the absolute value of the amount of change (see areas S in FIG. 5 and FIG. 11) of the shapes after the bending deformation from the stationary state in which the floor panels 10 and 10' are not bending-deformed increases. The magnitude of the amount of change of the shapes of the floor panels 10 and 10' as above is directly linked to the magnitude of the acoustic radiation power. In other words, the acoustic radiation power is preferred to be small in terms of increasing the NVH performance in the vehicle cabin.

Meanwhile, in Disclosure Example 1, as illustrated in FIG. 5, when vibration is input to the floor panel 10, the flat surface portion 13 having a lower rigidity than the curved surface portion 12 vibrates as with Related-art Example 1. However, the flat surface portion 13 is disposed to be closer to the panel center than the curved surface portion 12 is thereto, and hence the curved surface portion 12 does not vibrate and only the flat surface portion 13 included to be closer to the panel central side vibrates also at the time of resonance.

Figure 6:
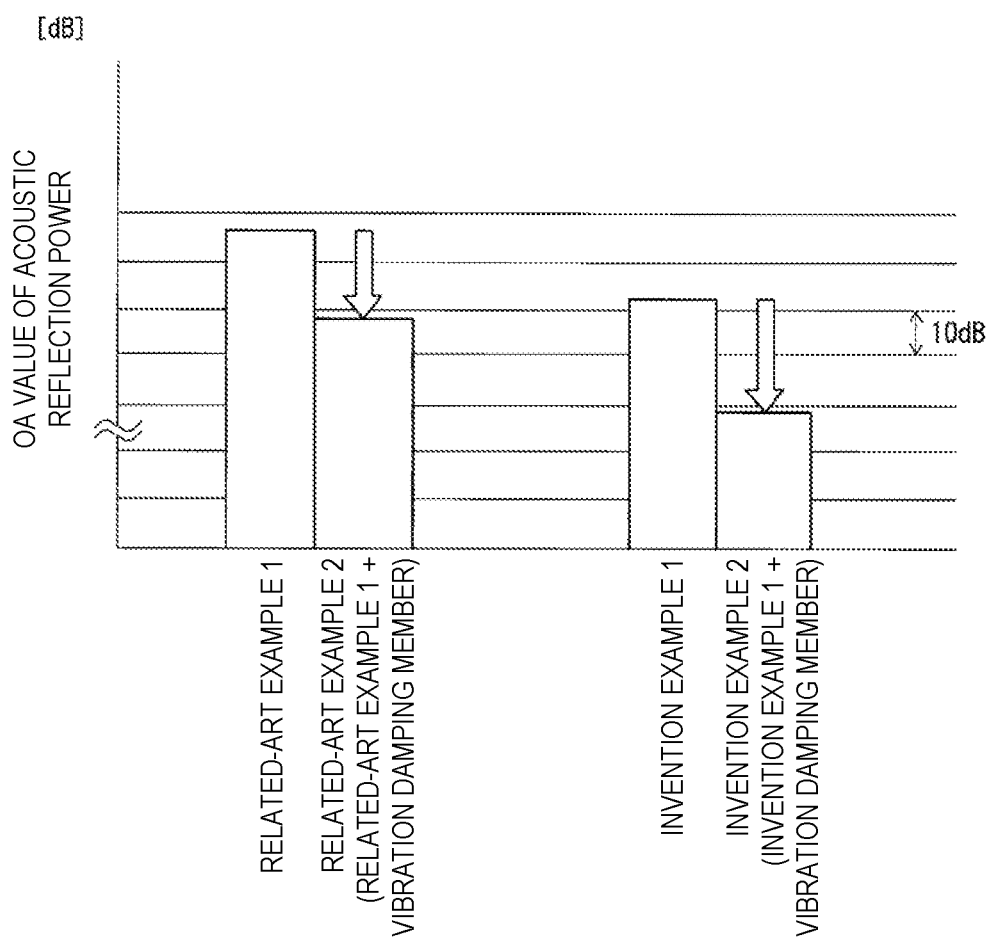
FIG. 6 is a graph comparing OA values of floor panels of this embodiment and a related-art form with each other in accordance with whether there is a vibration damping member.

FIG. 6 shows overall values (hereinafter referred to as "OA values") of the acoustic radiation power of floor panels (referred to as "Disclosure Example 2" and "Related-art Example 2") in which the vibration damping member 20 is added (applied) to the flat surface portions 13 and 13' and the curved surface portions 12 and 12' in addition to Disclosure Example 1 and Related-art Example 1 described above. In other words, the floor panel 10 of Disclosure Example 2 is the floor panel 10 of the abovementioned embodiment (see FIG. 1 to FIG. 4).

The OA values are values obtained by performing frequency analysis of detection signals of striking motions on the floor panel 10 by a striking head and calculating the sum total (sum of squares) of the acoustic radiation power of the entire analyzed frequency band (from 80 Hz to 450 Hz) for each strike.

As shown in the graph in FIG. 6, Disclosure Example 1 can keep the OA value lower than Related-art Example 1, and Disclosure Example 2 can keep the OA value lower than Related-art Example 2.

In addition, as it is clear from FIG. 6, the reduction rate of the OA value in Disclosure Example 2 with respect to Disclosure Example 1 is larger than the reduction rate of the OA value in Related-art Example 2 with respect to Related-art Example 1.

In other words, the effect of the dissipation of the vibration energy obtained by adding the vibration damping member 20 can be exhibited more prominently in the flat surface portion 13 that vibrates alone without being linked with the curved surface portion 12 as in Disclosure Example 1 than in the flat surface portion 13 that integrally vibrates with the curved surface portion 12 as in Related-art Example 1.

Although not shown, it is not preferred that the floor panel be formed such that the entire vehicle-body framework member enclosing region 6 is the curved surface portion 12, in other words, the floor panel be formed so as not to have the flat surface portion 13. This is because the rigidity of the entire vehicle-body framework member enclosing region 6 is averaged, and hence the entire vehicle-body framework member enclosing region 6 is assumed to integrally vibrate.

Figure 7:
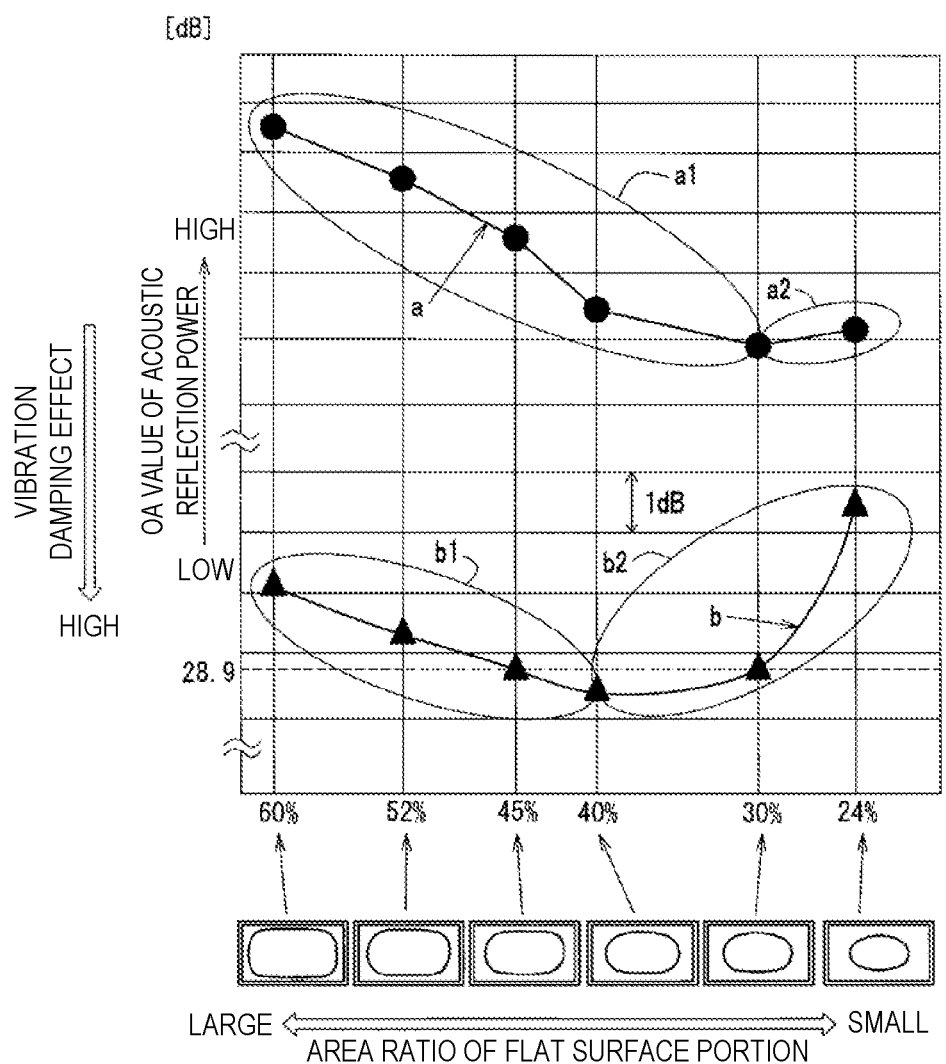
FIG. 7 is a graph showing the relationship of the OA value and the area ratio of a flat surface portion to the entire floor panel in accordance with whether there is a vibration damping member.
Figure 8A:
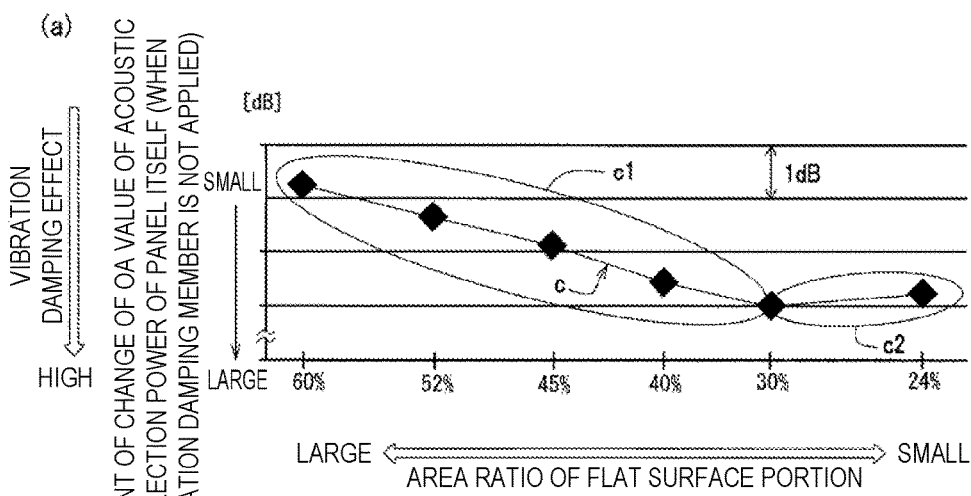
FIG. 8A is a graph showing the amount of change of the OA value of the floor panel of this embodiment with respect to a panel of which entirety has a planar shape in accordance with the area ratio of the flat surface portion to the entire floor panel and FIG. 8B is a graph showing the effect of the vibration damping member in accordance with the area ratio of the flat surface portion to the entire floor panel.
Figure 8B:
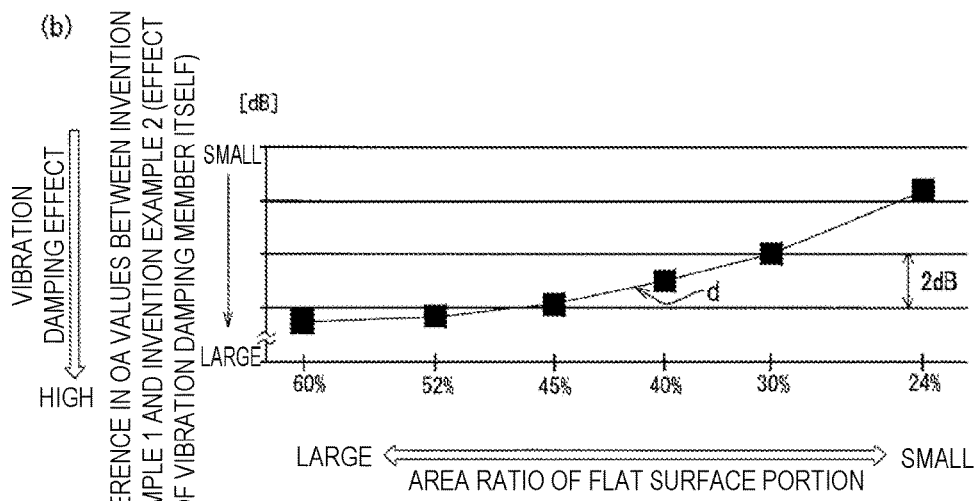

Next, an experiment that was performed in order to verify the difference (the magnitude of the OA values) in the vibration damping effect in accordance with the area ratio of the flat surface portion 13 to the entire floor panel 10 for two types, that is, Disclosure Example 1 (the floor panel 10 of the present disclosure to which the vibration damping member 20 was not applied) and Disclosure Example 2 (the floor panel 10 of the present disclosure to which the vibration damping member 20 was applied) is described with reference to FIG. 7 and FIGS. 8A-8B.

In this experiment, the area ratio is set to predetermined values (60 percent, 52 percent, 45 percent, 40 percent, 30 percent, and 24 percent) in a range from 60 percent to 24 percent, and the OA values for the predetermined area ratios are calculated for the two types of floor panels 10.

FIG. 7 is a graph generated on the basis of plot points of the OA values calculated as the result of the experiment. A waveform a in FIG. 7 indicates the OA values for the area ratios in Disclosure Example 1, and a waveform b in FIG. 7 indicates the OA values for the area ratios in Disclosure Example 2.

In this experiment, in addition to an experiment for acquiring the experimental result of FIG. 7, the amount of change of the OA values for the predetermined area ratios of Disclosure Example 1 with respect to a floor panel (hereinafter referred to as a "flat surface panel") (not shown) of which the entirety was formed in a planar shape as the standard (in other words, the amount of change of the OA value of Disclosure Example 1 with respect to the OA value of the flat surface panel for each area ratio) was also calculated.

FIG. 8A is a graph showing the experiment result and is a graph generated on the basis of the plot points of the amount of change of the calculated OA values. A waveform c in FIG. 8A shows the relationship of the amount of change of the OA values for the predetermined area ratios in Disclosure Example 1 with respect to the flat surface panel.

FIG. 8B is a graph showing the vibration damping effect obtained by adding the vibration damping member 20 to the floor panel 10 of Disclosure Example 1 for each of the predetermined area ratios. A waveform d in FIG. 8B indicates the relationship between the difference between the waveform a and the waveform b in FIG. 7, in other words, the difference in OA values between Disclosure Example 1 and Disclosure Example 2, and the predetermined area ratios.

First, when focusing on Disclosure Example 1 that does not include the vibration damping member 20, the OA value decreases as the area ratio decreases as it is clear from a region a1 of the waveform a in FIG. 7, and the amount of change of the OA value decreases as the area ratio decreases as it is clear from a region c1 of the waveform c in FIG. 8A when the area ratio of the flat surface portion 13 is in the range from 60 percent to 30 percent. In other words, in Disclosure Example 1, for both of the cases of the waveform a in FIG. 7 and the waveform c in FIG. 8A, the vibration damping effect increased as the area ratio of the flat surface portion 13 decreased when the area ratio of the flat surface portion 13 was in the range from 60 percent to 30 percent.

The flat surface portion 13 has a property of having a lower rigidity and vibrating more easily as compared to the curved surface portion 12. Therefore, the abovementioned result is considered to be due to the fact that the area in which the air above the floor panel 10 is vibrated decreases as the area of the flat surface portion 13 decreases.

When the area ratio of the flat surface portion 13 is in the range from 30 percent to 24 percent, the OA value increases as the area ratio decreases as it is clear from a region a2 of the waveform a in FIG. 7, and the amount of change of the OA value increases as the area ratio decreases as it is clear from a region c2 of the waveform c in FIG. 8A. In other words, in Disclosure Example 1, for both of the cases of the waveform a in FIG. 7 and the waveform c in FIG. 8A, as the area ratio of the flat surface portion 13 decreased, the vibration damping effect contrarily decreased when the area ratio of the flat surface portion 13 was in the range from 30 percent to 24 percent.

The result as above is considered to be due to the following reasons. As the area ratio of the flat surface portion 13 decreases, the curvature of the curved surface portion 12 decreases, and hence the rigidity of the curved surface portion 12 decreases. As a result, on the basis of a predetermined area ratio (see 30 percent (FIG. 7, FIG. 8A in this example) serving as a threshold value, the mode in which the curved surface portion 12 vibrates when the area ratio becomes smaller than the predetermined area ratio is expressed.

In other words, it is considered that the resonance is generated also in the curved surface portion 12 together with the flat surface portion 13 due to the decrease of the rigidity of the curved surface portion 12, and the entire panel vibrates, leading to increase in the OA value (see the region a2 in the waveform a in FIG. 7) and decrease in the amount of change of the OA value (see the region c2 in the waveform c in FIG. 8A).

As it is clear from the waveform a in FIG. 7 and the waveform c in FIG. 8A described above, in Disclosure Example 1 that does not include the vibration damping member 20, the OA value shows the minimum value, the amount of change of the OA value shows the maximum value, and the vibration damping effect is the highest when the area ratio is 30 percent.

Next, Disclosure Example 2 including the vibration damping member 20 is focused on, but examination is performed on the basis of the waveform d in FIG. 8B indicating the vibration damping effect obtained by adding the vibration damping member 20 to the floor panel 10 of Disclosure Example 1 therebefore. As is clear from the waveform d in FIG. 8B, when the area ratio is in the range from 60 percent to 24 percent, the vibration damping effect obtained by including the vibration damping member 20 increases as the area ratio of the flat surface portion 13 increases in the case of a panel shape as that of the floor panel 10 of this embodiment (see FIG. 1 to FIG. 5).

The result above is considered to be due to the fact that an advantageous effect is exhibited upon efficiently dissipating strain energy due to the vibration of the flat surface portion 13 by the vibration damping member 20 applied to the flat surface portion 13, because the vibration is generated more easily as the area of the flat surface portion 13 with a low rigidity increases. In other words, the result above is considered to be due to the fact that the strain energy due to the vibration of the flat surface portion 13 is accumulated in the vibration damping member 20 and is efficiently converted into thermal energy.

The result of the relationship between the area ratio of the flat surface portion 13 to the entire floor panel 10 and the OA value in Disclosure Example 2 that has the same panel shape as Disclosure Example 1 while including the vibration damping member 20 was obtained as indicated by the waveform b in FIG. 7.

The result of the waveform b in FIG. 7 is based on the results of the waveform d in FIG. 8B and the waveform a in FIG. 7 described above. Specifically, as indicated by the waveform b in FIG. 7, in Disclosure Example 2 including the vibration damping member 20, the OA value decreases as the area ratio decreases (see a region b1 of the waveform b in FIG. 7) when the area ratio of the flat surface portion 13 is in the range from 60 percent to 40 percent, and the OA value increases as the area ratio decreases (see a region b2 of the waveform b in FIG. 7) when the area ratio of the flat surface portion 13 is in the range from 40 percent to 24 percent.

As described above, as is clear from the waveform b in FIG. 7, in Disclosure Example 2, a result in which the OA value becomes equal to or less than a threshold value (28.9 dB) when the area ratio of the flat surface portion 13 is in the range from 45 percent to 30 percent and the OA value shows the minimum value when the area ratio of the flat surface portion 13 is 40 percent was obtained (see FIG. 7).

Figure 9:
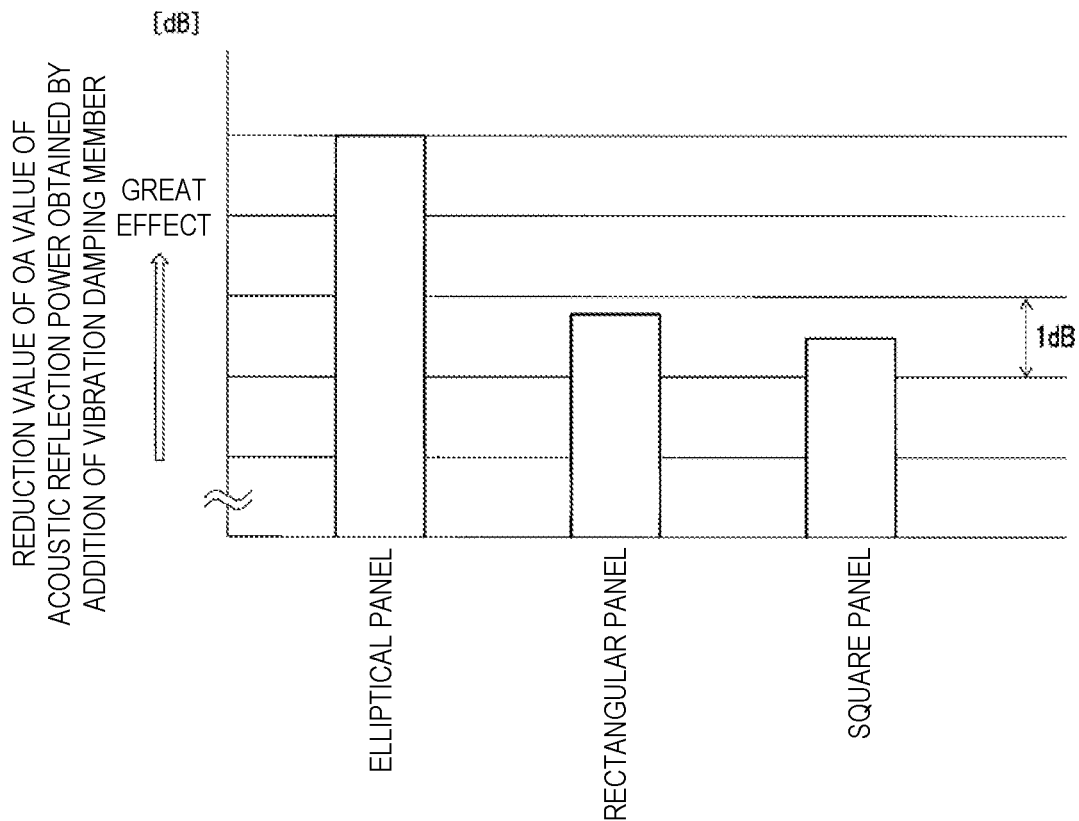
FIG. 9 is a graph showing the relationship between the differences in shape of an outer peripheral edge portion of the flat surface portion and the OA value.

FIG. 9 shows an experimental result obtained by verifying the difference in the reduction value (reduction effect) of the OA value due to the addition of the vibration damping member 20 in accordance with the difference in the shape of the flat surface portion of the floor panel of the present disclosure. In other words, FIG. 9 shows the reduction value of the OA value due to the addition of the vibration damping member 20 for each of three types of floor panels that are included in the present disclosure but have different shapes. The three types of floor panels are an elliptical panel, a rectangular panel, and a square panel as listed in the horizontal axis in FIG. 9. The elliptical panel indicates a floor panel in which the outer periphery shape of the flat surface portion 13 is an elliptical shape as in Disclosure Example 1 described above (see FIG. 2 and FIG. 5), the rectangular panel indicates a floor panel in which the outer periphery shape of the flat surface portion 13 is a rectangular shape (see FIG. 10C), and the square panel indicates a floor panel in which the outer periphery shape of the flat surface portion 13 is a square shape (see FIG. 10D). In the rectangular panel, outer periphery shapes of both of the flat surface portion 13 and the panel are formed as rectangular shapes, the longitudinal directions and the short directions coincide with each other, and the ratios (aspect ratios) of the longitudinal direction and the short direction substantially coincide with each other.

As shown in FIG. 9, regarding the reduction value (reduction effect) of the OA value due to the addition of the vibration damping member 20, the elliptical panel showed a high value that is twice or more of those of the rectangular panel and the square panel. In other words, the present disclosure is not limited to the shape of the floor panel 10 (elliptical panel) of the abovementioned embodiment and may employ a configuration including floor panels such as the rectangular panel and the square panel, but the elliptical panel, in other words, the floor panel 10 of the abovementioned embodiment, is preferred from the result of FIG. 9 because the vibration damping effect obtained by the addition of the vibration damping member 20 can be efficiently exhibited.

As illustrated in FIG. 1, the vehicle-body structure of the vehicle of this embodiment includes the vehicle-body framework members 2, 3, 4, 5, and 7 including the closed cross-section portions 2s, 3s, 4s, 5s, and 7s (closed cross-sectional spaces); and the floor panel 10 serving as the panel member to which vibration is transmitted from the engine or/and the suspension via the vehicle-body framework members 2, 3, 4, 5, and 7 such as the front side frames 7. In the vehicle-body structure as illustrated in FIG. 2 to FIG. 4, the floor panel 10 includes the flange portion 11, which is formed in a planar shape on the panel outer peripheral edge and to which the tunnel side frame 2, the side sill 3, and the cross members 4 and 5 on the front and rear sides (vehicle-body framework members) are joined along the panel outer peripheral edge; the curved surface portion 12 that is curved such that a place closer to the panel central side bulges out more to the lower side in a continuous manner from the panel-central-side edge portion 14 of the flange portion 11; and the flat surface portion 13 that extends to the panel central side from the panel-central-side edge portion of the curved surface portion 12 in a continuous manner.

With the abovementioned configuration, the curved surface portion 12 has a high rigidity due to having a curved surface and is restricted because the flange portion 11 included on the outer edge is joined to the vehicle-body framework members 2, 3, 4, and 5. Therefore, only the flat surface portion 13 resonates, and hence the mode in which the entire floor panel 10 vibrates can be suppressed.

In other words, with the abovementioned configuration, on the panel central side with respect to the flange portion 11 restricted by the vehicle-body framework members 2, 3, 4, and 5, the curved surface portion 12 and the flat surface portion 13 having a rigidity difference are included, and the curved surface portion 12 and the flat surface portion 13 are provided in a layout in which the curved surface portion 12 of which rigidity is high does not integrally vibrate with the flat surface portion 13 of which rigidity is low by being induced by the vibration of the flat surface portion 13. Therefore, only the flat surface portion 13 resonates, and the vibration as the entire floor panel 10 can be reduced.

In one aspect of the present disclosure, the vibration damping member 20 is applied to the curved surface portion 12 and the flat surface portion 13. With the abovementioned configuration, as illustrated in FIG. 2 to FIG. 4, by applying the vibration damping member 20 to at least the flat surface portion 13 that vibrates more easily due to having a lower rigidity than the curved surface portion 12, the strain energy is accumulated in the vibration damping member 20 and is dissipated (converted) as thermal energy. Therefore, the vibration of the floor panel 10 can be effectively damped.

In an aspect of the present disclosure, as indicated by the waveform b in FIG. 7, the flat surface portion 13 including the vibration damping member 20 is preferred to be provided at the area ratio that is within a range from 30 percent to 45 percent with respect to the entire floor panel 10 (see FIG. 7). With the abovementioned configuration, the influence of vibrating the air by the resonance can be suppressed (in other words, the NVH performance can be improved) more as the flat surface portion 13 is set to be smaller. However, when the flat surface portion 13 is set to be too small, the area ratio of the curved surface portion 12 in the entire floor panel 10 increases, and a mode in which the entire floor panel 10 resonates in which the curved surface portion 12 integrally vibrates with the flat surface portion 13 by being induced by the vibration of the flat surface portion 13 occurs. Therefore, by setting the flat surface portion 13 at the abovementioned appropriate area ratio, the vibration of the entire floor panel 10 can be further suppressed.

In an aspect of the present disclosure, the flat surface portion 13 is formed such that the outer peripheral edge portion 15 of the flat surface portion 13 has the substantially same aspect ratio as the aspect ratio of the rectangular floor panel 10 and has an oval or elliptical shape of which longitudinal direction and short direction substantially coincide with the longitudinal direction and the short direction of the floor panel. With the abovementioned configuration, the periphery of corner portions (sections equivalent to corners of the flat surface portion 13 in plan view) out of the flat surface portion 13 vibrates less easily as compared to a place on the central side with respect to the periphery of the corner portions. Therefore, there is a fear that the accumulation amount of the strain energy may be reduced in the vibration damping member 20 included on the periphery of the corner portions out of the vibration damping member 20 included in the flat surface portion 13 as compared to the vibration damping member 20 included on the central side.

Meanwhile, by forming the flat surface portion 13 in a round shape that does not have a corner portion, the entire flat surface portion 13 can be vibrated, and hence the strain energy can be efficiently accumulated and converted to thermal energy by the vibration damping member 20 included in the flat surface portion 13. Therefore, the mass efficiency of the vibration damping member 20 included in the flat surface portion 13 can be increased.

When the outer peripheral edge portion 15 of the flat surface portion 13 has a round shape, the curved surface portion 12 can be formed to be curved not only in an orthogonal cross-section along the short direction (vehicle front-rear direction) or the longitudinal direction (vehicle width direction) of the floor panel 10 but also in an orthogonal cross-section orthogonal to the up-down direction. In other words, when the outer peripheral edge portion 15 of the flat surface portion 13 has a round shape, the curved surface portion 12 can be formed as a three-dimensional curved shape curved in two directions and not as a two-dimensional curved shape curved in only one direction.

The present disclosure is not limited to the configurations of the abovementioned embodiment and can be formed by various embodiments.

Figure 10A:
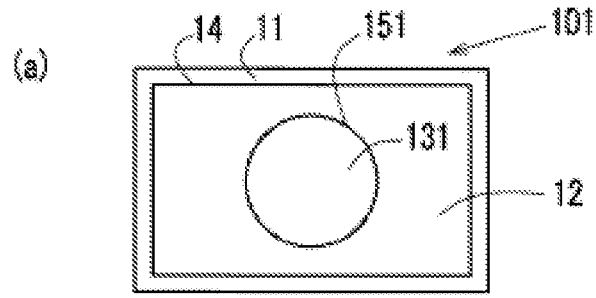
FIGS. 10A-E are plan views of floor panels according to modifications of the present disclosure.

In the floor panel of the present disclosure, an outer peripheral edge portion 151 of a flat surface portion 131 is not limited to being formed in an elliptical shape as described above as in the floor panel 10 of the abovementioned embodiment, and may be formed as other round shapes, for example, in a perfect circle shape as in a floor panel 101 of Modification 1 illustrated in FIG. 10A.

Figure 10B:
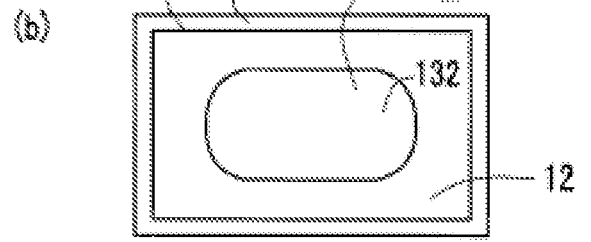

Alternatively, in the floor panel of the present disclosure, as in a floor panel 102 of Modification 2 illustrated in FIG. 10B, an outer peripheral edge portion 152 of a flat surface portion 132 may be formed as other round shapes, for example, in an oval shape (an external shape obtained by connecting two perfect circles having the same size that are spaced apart from each other by straight lines extending in the tangential direction).

Figure 10C:
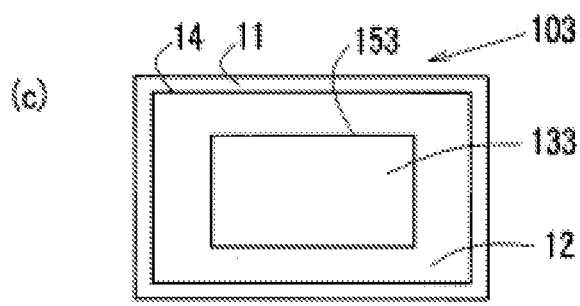
Figure 10D:
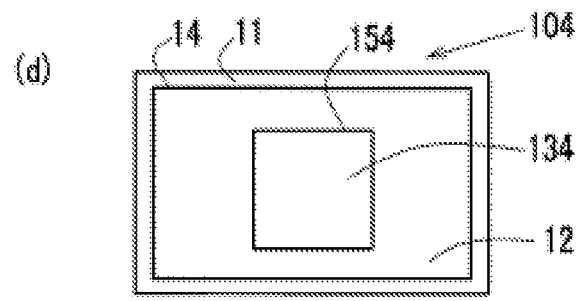

In the floor panel of the present disclosure, an outer peripheral edge portion 153 of a flat surface portion 133 may be formed in a rectangular shape as in a floor panel 103 of Modification 3 illustrated in FIG. 10C, or an outer peripheral edge portion 154 of a flat surface portion 134 may be formed in a square shape as in a floor panel 104 of Modification 4 illustrated in FIG. 10D. In other words, as described above, the floor panel of the present disclosure may be formed as a rectangular panel or a square panel (see FIG. 9).

Figure 10E:
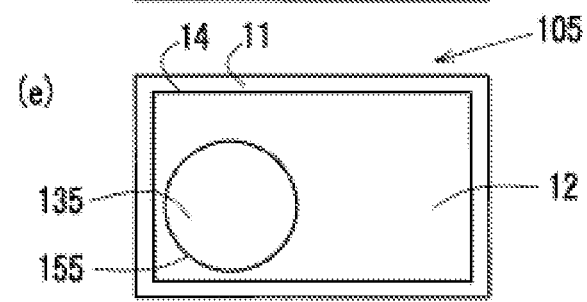

In the floor panel of the present disclosure, the flat surface portion 131 is not limited to being provided in a position at which the center thereof coincides with the center of the floor panel 101 in plan view as in the floor panel 101 of Modification 1 illustrated in FIG. 10A, and a flat surface portion 135 may be provided in a position at which the center thereof is eccentric with respect to the center position of a floor panel 105 in plan view as in the floor panel 105 of Modification 5 illustrated in FIG. 10E. In FIG. 10E, an outer peripheral edge portion 155 of the flat surface portion 135 has a perfect circle shape as an example of the floor panel 105 of Modification 5. Needless to say, the outer peripheral edge portion of the flat surface portion eccentric from the panel center may have other shapes. In FIG. 10A to FIG. 10E, sections having the same form as those of the floor panel 10 of the abovementioned embodiment are denoted by the same reference characters and description thereof is omitted.

The floor panel of the present disclosure is not limited to a configuration in which the vibration damping member 20 is included in both of the curved surface portion 12 and the flat surface portion 13 as in the floor panel 10 of the abovementioned embodiment, and a configuration in which the vibration damping member 20 is included in only the flat surface portion 13 may be employed as long as at least the flat surface portion 13 includes the vibration damping member 20.

The vibration damping member 20 is not limited to being applied from the lower surface side of the floor panel 10, and a configuration in which the vibration damping member 20 is applied to only the upper surface side or both of the upper and lower surfaces may be employed.

The flat surface portion 13 is not limited to having the entirety thereof formed by a completely flat surface, and includes a flat surface portion formed in a planar shape having a section of which shape partially changes in the up-down direction such as a bead (protrusion), a groove (recess), or/and a drain hole within a range in which practical application as the floor panel 10 is possible from the viewpoint of rigidity and function.

The floor panel of the present disclosure is not limited to being formed in a recessed shape such that the flat surface portion 13 is be positioned on the lower side with respect to the flange portion 11 as in the floor panel 10 of the abovementioned embodiment, and may be formed in a protruding shape such that the flat surface portion is positioned on the upper side (vehicle cabin side).

What is claimed is:

1. A vehicle-body structure of a vehicle, the vehicle-body structure comprising:

a vehicle-body framework member including a closed cross-section portion; and
    a panel member to which vibration is transmitted from an engine or/and a suspension via the vehicle-body framework member, wherein:
    the panel member includes:
    a flange portion having a planar shape on a panel outer peripheral edge and to which the vehicle-body framework member is joined along the panel outer peripheral edge;
    a curved surface portion that is curved such that a place closer to a panel central side bulges out more to an upper side or a lower side in a continuous manner from a panel-central-side edge portion of the flange portion; and
    a flat surface portion that extends to the panel central side from the panel-central-side edge portion of the curved surface portion in a continuous manner.

2. The vehicle-body structure of the vehicle according to claim 1, comprising a vibration damping member on at least the flat surface portion out of the curved surface portion and the flat surface portion.

3. The vehicle-body structure of the vehicle according to claim 2, wherein the flat surface portion including the vibration damping member is provided at an area ratio that is within a range from 30 percent to 45 percent with respect to an entirety of the panel member.

4. The vehicle-body structure of the vehicle according to claim 3, wherein:

the panel member is a floor panel; and
    an outer peripheral edge portion of the flat surface portion has a substantially same aspect ratio as an aspect ratio of the floor panel having a rectangular shape in vehicle plan view and has an oval or elliptical shape of which longitudinal direction and short direction substantially coincide with a longitudinal direction and a short direction of the floor panel.

5. The vehicle-body structure of the vehicle according to claim 2, wherein:

the panel member is a floor panel; and
    an outer peripheral edge portion of the flat surface portion has a substantially same aspect ratio as an aspect ratio of the floor panel having a rectangular shape in vehicle plan view and has an oval or elliptical shape of which longitudinal direction and short direction substantially coincide with a longitudinal direction and a short direction of the floor panel.

6. The vehicle-body structure of the vehicle according to claim 1, comprising a vibration damping member on at least the flat surface portion out of the curved surface portion and the flat surface portion, wherein the vibration damping member comprises at least one of a foamed polyurethane resin serving as a viscoelastic member, a rubber material, and an elastomer resin.

7. The vehicle-body structure of the vehicle according to claim 1, comprising a vibration damping member on an entire region of a lower surface of the flat surface portion and the curved surface portion, the vibration damping member having a substantially uniform thickness.

8. The vehicle-body structure of the vehicle according to claim 1, wherein:

the panel member is a floor panel; and
    an outer peripheral edge portion of the flat surface portion has a substantially same aspect ratio as an aspect ratio of the floor panel having a rectangular shape in vehicle plan view and has an oval or elliptical shape of which longitudinal direction and short direction substantially coincide with a longitudinal direction and a short direction of the floor panel.

9. The vehicle-body structure of the vehicle according to claim 8, wherein:
- the curved surface portion is curved in an orthogonal cross-section along the short direction or the longitudinal direction of the floor panel; and
- the curved surface portion is curved in an orthogonal cross-section orthogonal to the up-down direction of the floor panel.

\* \* \* \* \*